(12) United States Patent
Young et al.

(10) Patent No.: US 8,341,040 B1
(45) Date of Patent: Dec. 25, 2012

(54) SYSTEM AND METHOD FOR STOW MANAGEMENT OF SIMILAR ITEMS

(75) Inventors: Eric Young, Mercer Island, WA (US);
Devesh Mishra, Issaquah, WA (US);
Timothy Jesse Tien, Seattle, WA (US);
Michael McKenna, Bellevue, WA (US)

(73) Assignee: Amazon Technologies, Inc., Reno, NV (US)

(*) Notice: Subject to any disclaimer, the term of this patent is extended or adjusted under 35 U.S.C. 154(b) by 1013 days.

(21) Appl. No.: 12/246,672

(22) Filed: Oct. 7, 2008

(51) Int. Cl.
*G06Q 10/00* (2012.01)
(52) U.S. Cl. .................................... 705/28; 705/1.1
(58) Field of Classification Search .................. None
See application file for complete search history.

(56) References Cited

U.S. PATENT DOCUMENTS

| | | | | |
|---|---|---|---|---|
| 4,812,629 | A * | 3/1989 | O'Neil et al. .................. | 235/383 |
| 4,896,024 | A * | 1/1990 | Morello et al. ................ | 235/381 |
| 6,812,838 | B1 * | 11/2004 | Maloney ..................... | 340/568.1 |
| 6,842,665 | B2 | 1/2005 | Karlen | |
| 7,246,706 | B1 | 7/2007 | Shakes et al. | |
| 7,289,969 | B1 * | 10/2007 | Ballenger et al. ............... | 705/28 |
| 7,702,546 | B2 * | 4/2010 | Kawasaki et al. ............... | 705/28 |
| 7,894,932 | B2 * | 2/2011 | Mountz et al. ................. | 700/214 |
| 2002/0077937 | A1 * | 6/2002 | Lyons et al. .................... | 705/28 |
| 2003/0036985 | A1 * | 2/2003 | Soderholm ..................... | 705/28 |
| 2003/0101107 | A1 * | 5/2003 | Agarwal et al. ................. | 705/28 |
| 2003/0120565 | A1 * | 6/2003 | Church et al. .................. | 705/28 |
| 2004/0188524 | A1 * | 9/2004 | Lunak et al. ................... | 235/385 |
| 2007/0011053 | A1 * | 1/2007 | Yap ................................ | 705/22 |
| 2008/0071418 | A1 | 3/2008 | Antony et al. | |

\* cited by examiner

*Primary Examiner* — Asfand Sheikh
(74) *Attorney, Agent, or Firm* — Robert C. Kowert; Meyertons, Hood, Kivlin, Kowert & Goetzel, P.C.

(57) ABSTRACT

Various embodiments of a system and method for stow management of similar items are described. Various embodiments may include a control system and/or an electronic stow component configured to determine whether a bin is eligible to stow a unit of a particular item. For instance, an agent tasked with stowing items as inventory in a materials handling facility may use such electronic stow component and/or the control system to determine whether a bin is eligible to stow a unit of a particular item. For instance, the electronic stow component may identify a bin to evaluate, identify a unit of a particular item, and determine whether the bin is eligible to store the unit of the particular item according to various methods and techniques for preventing the stowage of like items in nearby bins.

45 Claims, 10 Drawing Sheets

SYSTEM AND METHOD FOR STOW MANAGEMENT OF SIMILAR ITEMS

BACKGROUND

In a distribution system, a retailer or other product distributor (which may collectively be referred to as distributors) typically maintains an inventory of various items at one or more distribution centers, fulfillment centers, cross-docking facilities, materials handling facilities or warehouses (which may collectively be referred to herein as a materials handling facility). The inventory items are ordered from one or more vendors, received at the materials handling facilities as inbound shipments, and stocked in inventory of the materials handling facilities. In an order fulfillment process, orders for items may be received from customers of the distributor. Units of the ordered items are picked from various locations in the inventory in the materials handling facilities, processed for shipping, and shipped as outbound shipments to the customers.

The process of conveying units, such as units of items purchased from a product vendor to replenish inventory, from a receiving stage or another stage to a storage stage (e.g., storing as inventory) is sometimes referred to as stowing. The manner in which items are stowed can affect the operational performance of the materials handling facility. For instance, placing units of a frequently ordered item in an area of the materials handling facility that is not easily accessible may hinder the operational performance of the materials handling facility. For example, the requisite time to fulfill orders including units of such item may increase do to the difficulty in picking such units from inventory. In some cases, the manner in which items are stowed may affect the accuracy of picking operations. For instance, if items are stowed in incorrect locations or stowed with incorrect labels, an agent seeking to pick a given item from inventory may mistakenly pick an incorrectly labeled unit or a unit stored in the wrong location.

Figure 1:
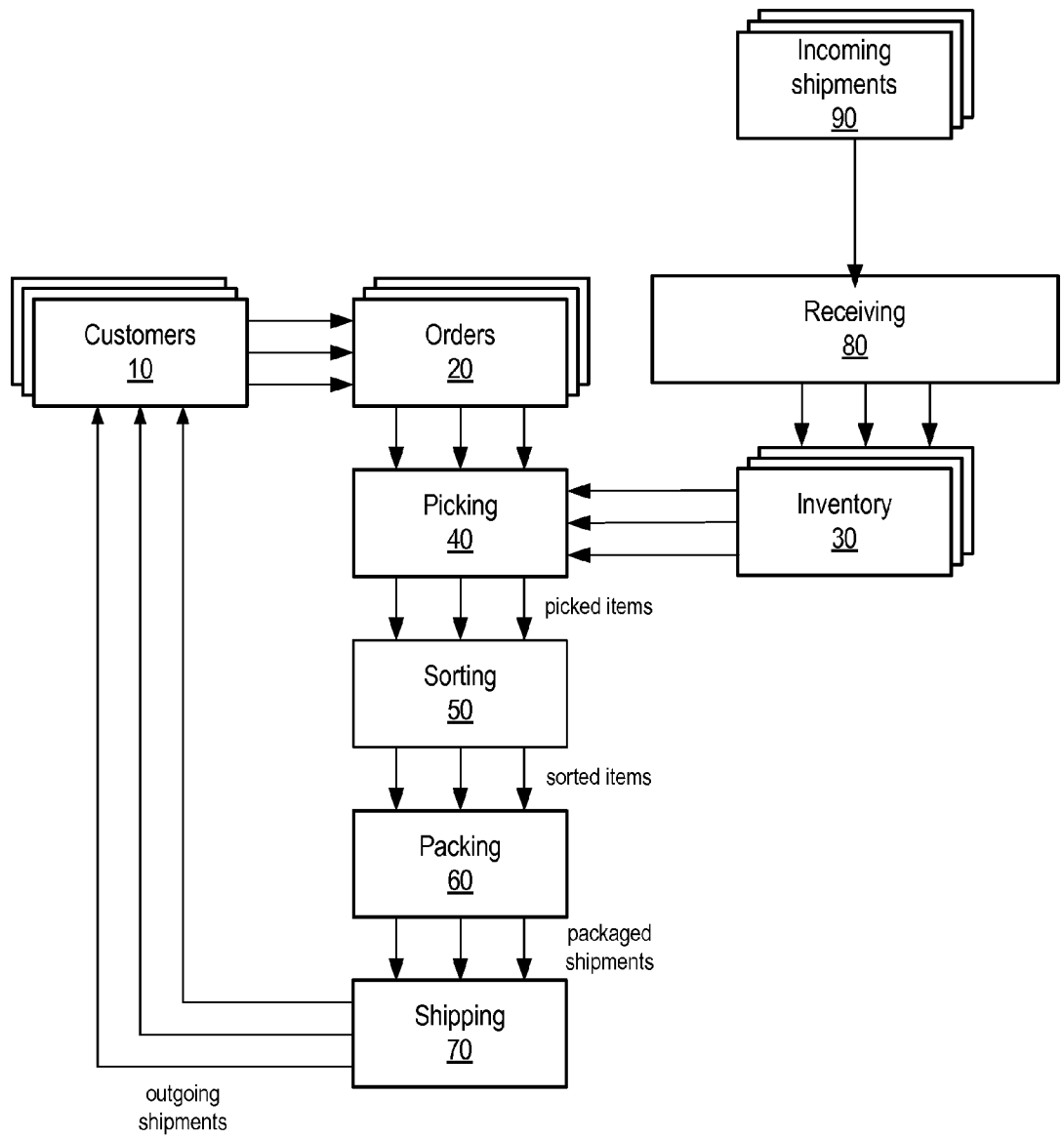
FIG. 1 illustrates a logical representation or view of the operation of a materials handling facility in which embodiments of the system and method for stow management of similar items may be implemented, according to some embodiments.

While various embodiments are described herein by way of example for several embodiments and illustrative drawings, those skilled in the art will recognize that various embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope of various embodiments as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a system and method for stow management of similar items are described. Various embodiments may include a control system and/or an electronic stow component (e.g., a portable, handheld reader or other device) configured to determine whether a bin (e.g., a stowage area, location, or receptacle configured to store one or more units of items) is eligible to stow a unit of a particular item. For instance, an agent (e.g., a human operator) tasked with stowing items as inventory in a materials handling facility may use such electronic stow component and/or the control system to determine whether a bin is eligible to stow a unit of a particular item. For instance, the electronic stow component may identify a bin to evaluate, identify a unit of a particular item, and determine whether the bin is eligible to store the unit of the particular item according to various methods and techniques described in more detail below. In one example, the electronic stow component may be configured to determine that bins close to the bin being evaluated contain items similar to the item that is to be stowed. In such case, the electronic stow component may indicate that the item to be stowed cannot be stowed in the bin undergoing evaluation. As described in more detail below, enforcing such techniques for stowing can prevent errors during a picking process where items are picked from bins for various reasons (e.g., to fulfill a customer order).

In some embodiments, the control system described herein may be configured to direct one or more units of items to be stowed in particular bins. For instance, a group of items may be received at a materials handling facility via a receiving process where units are received and prepared to be placed into inventory. The control system described herein may identify such units by item and direct the conveyance of such items to particular bins (or other stow locations). For instance, the control system may generate instructions to various components under the control of the control system, such as conveyance systems (e.g., one or more conveyors), to deliver the received units to respective bins. In other cases, the control system may generate instructions to agents, who in turn deliver various units to respective bins as specified by the instructions. Note that in some cases portions of the description presented herein may refer to only the control system or only the electronic stow component (e.g., reader 196, described below). However, it should be understood that in various embodiments any functionality described with respect to the control system may also be performed by the electronic stow component, and vice versa. Also note that in various embodiments, the control system and the electronic stow component may in various embodiments perform in conjunction to achieve the functionality described herein.

Overview of the Materials Handling Facility

FIG. 1 illustrates a logical representation or view of the operation of a materials handling facility in which various embodiments may be implemented. For example, this Figure may illustrate a materials handling facility of a product distributor or e-commerce enterprise. Multiple customers 10 may submit orders 20 to the product distributor, where each order 20 specifies one or more units of items from inventory 30 to be shipped to the customer that submitted the order. To fulfill the customer orders 20, the one or more units of items specified in each order may be retrieved, or picked, from inventory 30 (which may also be referred to as stock storage) in the materials handling facility, as indicated at 40. Picked units may be delivered or conveyed, if necessary, to one or more stations in the materials handling facility for sorting 50 into their respective orders, packing 60, and finally shipping 70 to the customers 10. In various embodiments, picked units may be delivered to an induction station, where the units are inducted into a sorting system (e.g., a sorting mechanism, sorting process, or some combination thereof). The units may then be routed to particular destinations in accordance with the requests (orders) currently being processed, e.g. to sorting stations, under direction of the control system. Various sorting mechanisms and processes (which may be represented by sorting 50) are described in more detail below. A picked, packed and shipped order does not necessarily include all of the units ordered by the customer; an outgoing shipment to a customer may include only a subset of the ordered units available to ship at one time from one inventory-storing location. In other cases, units of the order may be split into multiple shipments for a variety of reasons including but not limited to space and/or economic efficiency. For instance, shipping a set of units in three small shipments may be less expensive than shipping the set of units in one large shipment.

A materials handling facility may also include a receiving 80 operation for receiving shipments of stock from one or more sources (e.g., vendors) and for placing the received stock into stock storage. The receiving 80 operation may also receive and process returned purchased or rented units or orders from customers. At least some of these units are typically returned to inventory 30. The various operations of a materials handling facility may be located in one building or facility, or alternatively may be spread or subdivided across two or more buildings or facilities.

Figure 2:
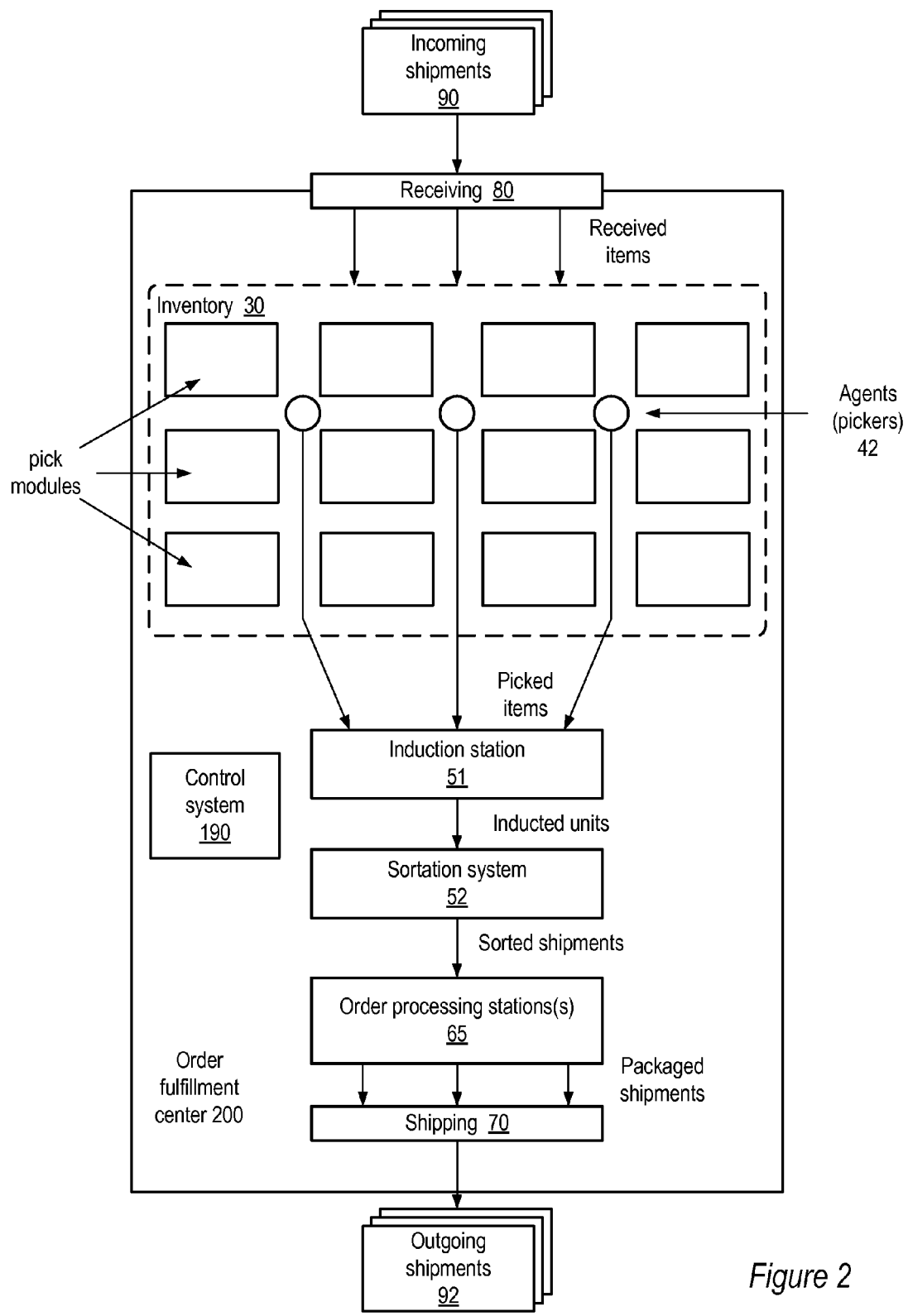
FIG. 2 illustrates one embodiment of the physical layout of a materials handling facility, according to some embodiments.

FIG. 2 illustrates an example of a physical layout of a materials handling facility, such as an order fulfillment facility or center, in which embodiments of the control system may be implemented. At any one time, one or more agents 42 of the distributor may each be picking units from inventory 30 to fulfill portions or all of one or more requests or orders. This may result in multiple units (e.g., a stream of units and/or batches of picked units) for multiple incomplete or complete orders, which may then be delivered to an induction station 51 for sortation system 52, which may include sorting mechanisms and/or sorting processes for sorting units into respective shipments of units. For example, in some embodiments, the induction point may refer to a station where units may be inducted into a conveyance mechanism for conveying units to sorting stations configured for sorting units into respective shipments.

In some embodiments, the conveyance mechanism (under direction of the control system) may then deliver the units to various order processing stations 65, which may include one or more packing stations, in the materials handling facility for processing prior to shipping 70. Portions of an order may be received from the pickers 42, or from other stations, at a processing station 65 at different times, so processing at a station may have to wait for one or more units for some orders to be delivered to the station from picking and/or from another station before completion of processing of the orders at the station. The picked units of items delivered to a processing station via a conveyance mechanism may be processed at a processing station 55, for example sorted into their respective orders at a sorting station under direction of the control system. Once the processing of units for an order is completed at a station, the units may be delivered to another station for further processing, for example to a sorting station to be sorted into orders, or to a packing station to be packaged for shipping 70.

A materials handling facility may also include one or more receiving 80 operations for receiving shipments 90 of stock from various vendors. The received stock may then be placed into stock storage. The receiving 80 operation may also receive and process returned, purchased, or rented units from customers. The various operations and stations of a materials handling facility may be located in one building or facility, or alternatively may be spread or subdivided across two or more buildings or facilities.

In various embodiments, control system 190 may generate and/or maintain a stored indication of the state of each unit within the materials handling facility (e.g., each unit might have its own record in a database of the control system). For example, such a stored indication may indicate, for each of one or more of the units within the materials handling facility, the location of the unit (e.g., a particular bin in storage, an induction station, a sortation system, an order processing station, etc.) and/or the fulfillment process that the unit is currently undergoing (e.g., induction, sorting, packing, shipping, etc.).

Preventing the Stowage of Similar Items in Close Bins

Figure 3:
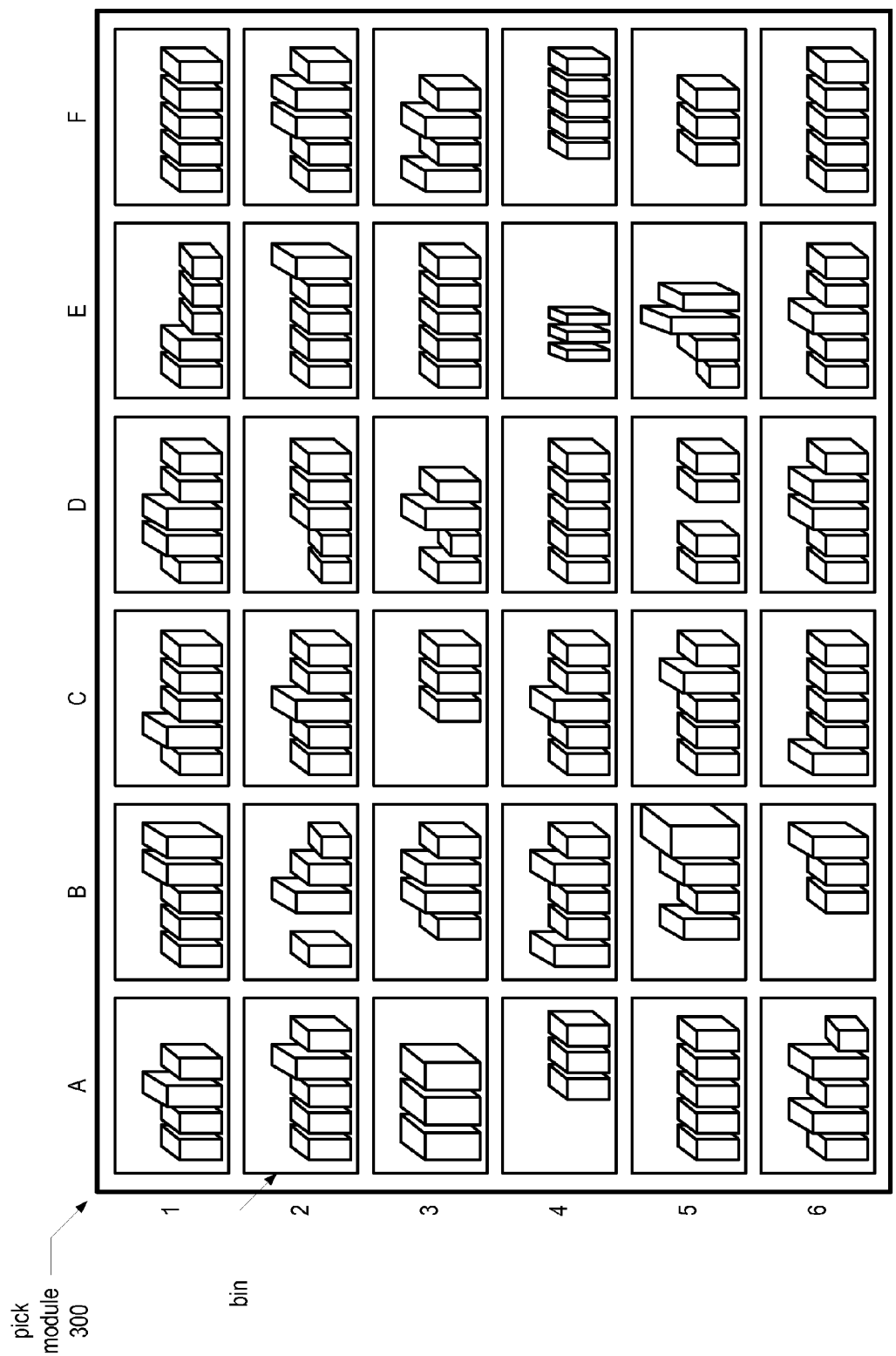
FIG. 3 illustrates a pick module that includes multiple bins configured to hold items, according to some embodiments.

FIG. 3 illustrates a pick module, such as a shelving unit or other structure configured to stow units of items, according to various embodiments. As described above, multiple pick modules may reside in the materials handling facility. As illustrated, pick module 300 may include multiple bins each configured to stow one or more units of items. In various embodiments, units may be stowed in such pick modules subsequent to a receiving process (e.g., receiving 80, described above). In other cases, items may be directed from other processes to the stowing stage. For instance, sorting process 50 may send extra or erroneously picked items back to the stowing stage. Note that the description presented herein refers to bins by column and row number. For instance, pick module 300 includes bins A1, A2, A3, B1, B2, B3 and so on. While pick module 300 includes bins of uniform size, in various other embodiments pick modules may include bins of different sizes. Also note that the illustrated pick module includes various units of items stowed within ones of the bins. For clarity of illustration, these units have not been individually numbered but nevertheless may be referred to by their bin location (e.g., "the unit of bin A1" and so on). The units stored in the pick module may include any of a variety of items, such as books, compact discs, electronics, apparel, or any other item or product. In one embodiment, the units stored in the various pick modules may be inventory units used to fulfill orders from an e-commerce website.

Note that in various embodiments, pick modules may be a collection or group of bins and may not necessarily be a physical structure. Similarly, in some embodiments, bins need not be a physical container and instead may be a designated area. For instance, bins may be designated portions of floor space (e.g., numbered squares on the facility floor) in one embodiment, and storing a unit in such a bin would include placing the unit on a particular portion of the floor space.

Figure 4A:
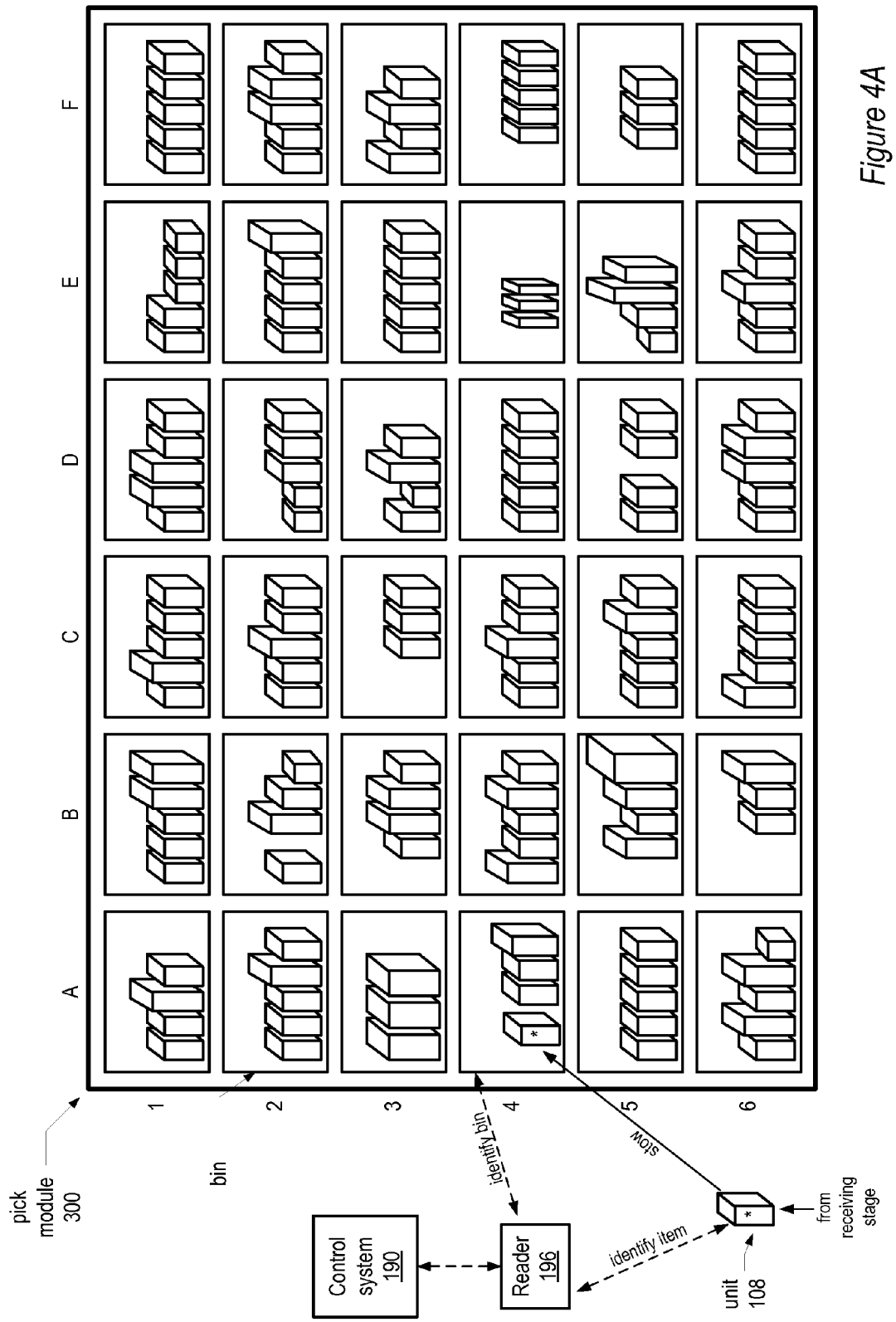
FIGS. 4A-4B illustrate the stowing of an item in a pick module, according to some embodiments.

FIG. 4A illustrates one example of stowing a unit, such as a unit from a receiving stage or elsewhere, into a bin of a pick module. As illustrated, an agent may be tasked with stowing one or more units, such as unit 108, in a bin of a pick module. For instance, an agent may search inventory 30 for a bin with available space in which to stow a given unit. In the illustrated embodiment, an agent has chosen to stow unit 108 in bin A4. To do so, the agent may utilize reader 196, which is one example of an electronic stow component, to identify the unit to be stowed. For instance, the agent may scan a barcode of unit 108 with an optical scanner. In other example, the unit may be identified by scanning a radio frequency identifier (RFID) tag affixed to the unit. In other cases, other techniques for identifying unit 108 may be employed. The agent may also identify the bin via similar techniques. For instance, the bin may be tagged with a barcode or RFID tag and reader 196 may identify the bin (in this case, bin A4) based on the bin's tag. The agent may place unit 108 in bin A4 and may also confirm such placement, such as by activating a control on reader 196 (e.g., a confirmation button of some sort). Note that the identification of the bin and the item as well as the placement of such item in the bin may occur in different orders according to various embodiments. Reader 196 may provide the collected information to control system 190 which may accordingly update a stored representation of the various pick modules, such as a database. Such representation may, for any of the bins within the materials handling facility, indicate the units stored in such bins. In various embodiments, such representation may be updated in real-time to reflect the status of inventory units within the materials handling facility at any given moment.

Figure 4B:
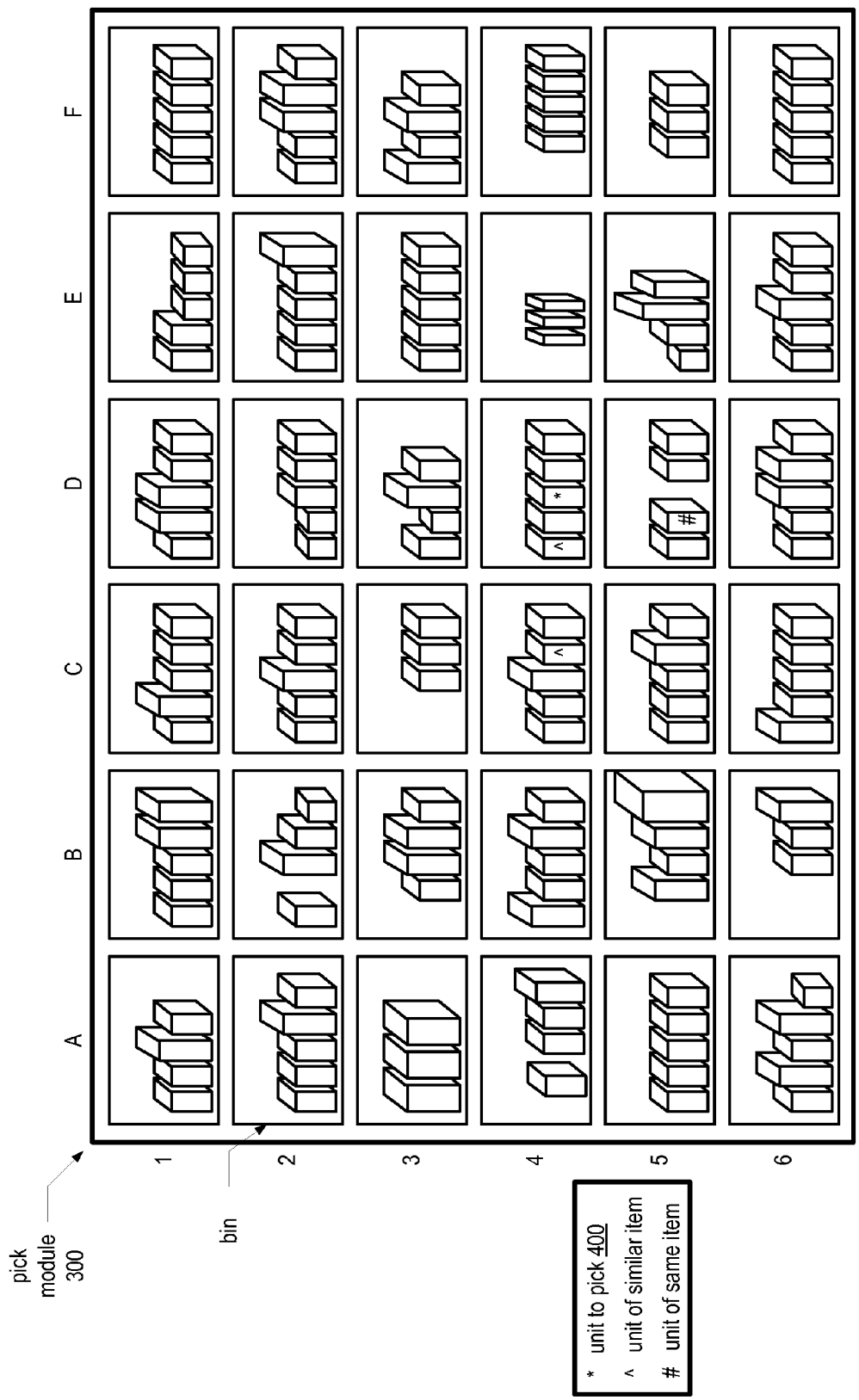

The stow process described above may be repeated for multiple items. For instance, any of the items of pick module 300 may be stowed according to the stow process described above. However, the application of such process to multiple items may result in situations that facilitate errors in picking process (e.g., picking items from inventory for order fulfillment). One such situation is illustrated by FIG. 4B. In the illustrated embodiment, an agent is instructed to pick one or more items including the designated unit of a particular item in bin D4. However, note that the stowing process of FIG. 4A has resulted in a situation where a unit of a similar (but not the same) unit is stored in bins D4 and C4. Additionally, another unit of the same item is stored in bin D5 in this example. Since units of the same and similar items may closely resemble the unit that the agent is directed to pick, such a unit may be accidentally picked by an agent as he arrives to pick unit 400. In the case where an agent picks a unit of a similar (but not the same) item, the agent may indicate (e.g., via reader 196) that he picked unit 400 when he actually did not. This may cause a discrepancy between the stored representation of pick modules and the actual units stored on the pick modules; errors in subsequent processing stages (e.g., sorting) may also occur as a result of an agent picking a unit of the wrong item. In the case where an agent picks a unit of the same item as unit 400, subsequent processes (e.g., sorting) may be unaffected but discrepancies between the stored representation of the pick modules and the actual units stored in the pick modules may still occur. Note as used herein with respect to units of items, the term "similar" is used to mean "similar but not the same as." For instance, a unit of an item that is similar to another item is similar to but not the same as a unit of the other item.

Figure 5A:
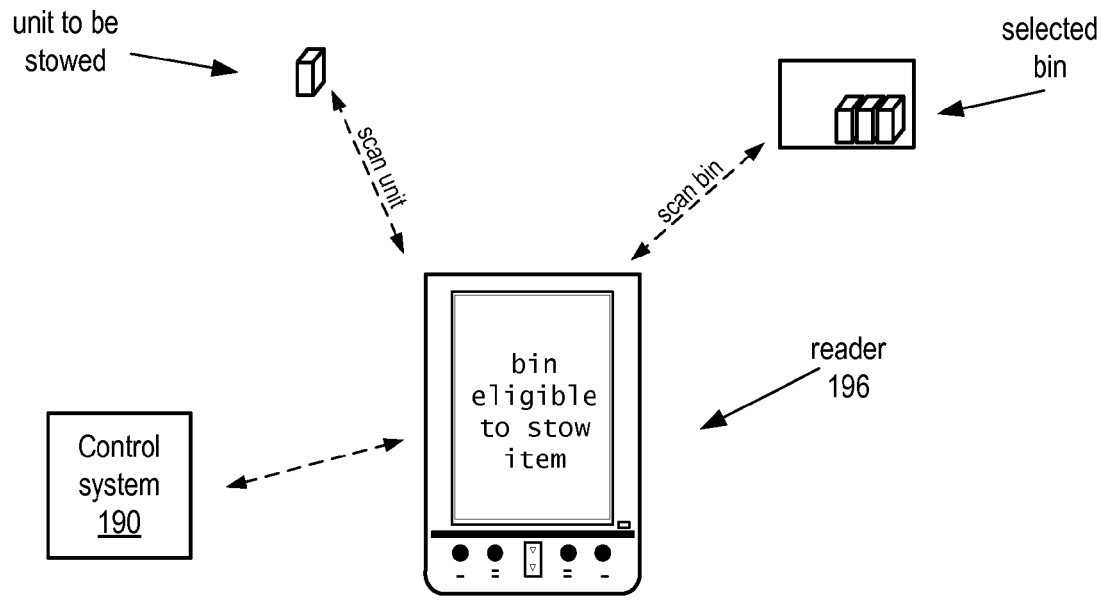
FIGS. 5A-5B illustrate a device configured to indicate and/or determine whether a given bin is eligible to stow a unit of a particular item, according to some embodiments.
Figure 5B:
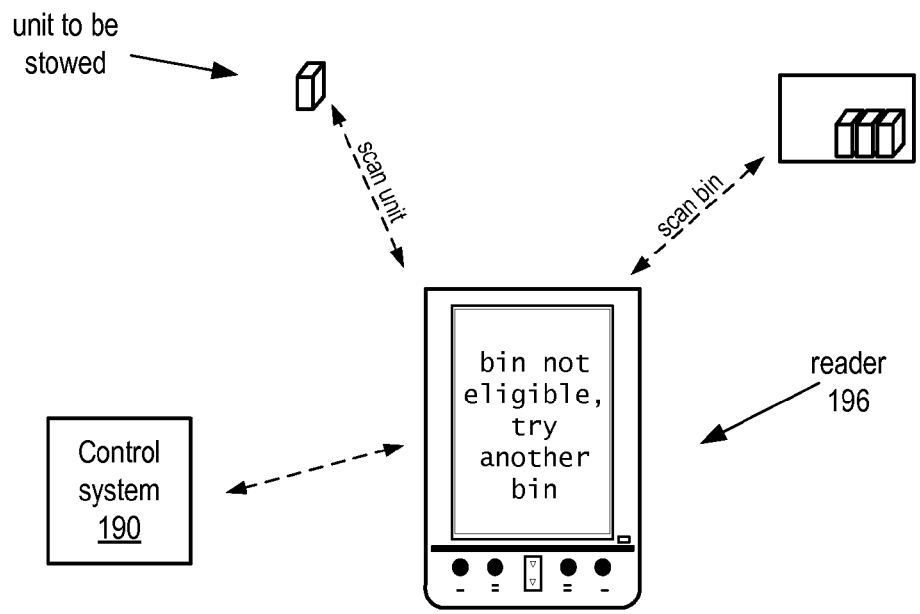

FIGS. 5A-B illustrate one version of reader 196 according to various embodiments. In the illustrated embodiment, reader 196 may be an electronic stow component configured to generate an indication of whether a given bin is eligible to stow a unit of a particular item. For instance, instead of recording the placement of a unit in a particular bin as described above with respect to FIG. 4, the illustrated reader may evaluate a given bin, such as a bin selected by an agent and scanned with reader 196, to determine whether the bin is eligible to store a unit of a particular item. Once such determination is made, the reader may inform the agent as to whether or not the unit should be stored in that bin. For instance, in FIG. 5A, reader 195 scans the unit to be stowed to determine its identity, scans the bin selected by the agent to determine its identify, performs an evaluation as to whether the bin is eligible to store the unit to be stowed, and indicates that the unit is eligible to be stowed in the selected bin. In the example of FIG. 5B, reader 195 scans the unit to be stowed to determine its identity, scans the bin selected by the agent to determine its identify, performs an evaluation as to whether the bin is eligible to store the unit to be stowed, and indicates that the unit is not eligible to be stowed in the selected bin. The process by which the reader determines such eligibility, described in more detail below, may prevent an agent from stowing similar units in the same bin or in bins determined to be close to each other. In this way, for an agent instructed to pick a unit of a particular item from a particular bin, the manner in which the units are stowed may prevent the picking agent from mistakenly picking a unit of a similar item from a bin that is close to the bin from which he is instructed to pick a unit. Additionally, while in some embodiments units of the same item may be stowed in the same bin, reader 196 and/or control system 190 may prevent the stowage of a unit of the same item in bins that are determined to be close to each other. In this way, for an agent instructed to pick a unit of a particular item from a particular bin, the manner in which the units are stowed may prevent the picking agent from mistakenly picking a unit of the same item from a bin that is close to the bin from which he is instructed to pick the unit of the particular item.

One process by which reader 196 and/or control system 190 may determine whether a selected bin is eligible to stow a given unit of the particular item is described in more detail below. Such process may apply to each of multiple items to be stowed. For example, in one case, an agent may convey a tote containing multiple items to be stowed throughout various portions of inventory 30. The agent may, e.g., attempt to stow a given unit in a bin of one of the pick modules of inventory 30. To ensure that the given bin selected is eligible, the agent may scan the bin with reader 196. Reader 196 may determine the bin's identity (e.g., via optical scanning, RFID, etc.) and provide control system 190 with such information. The agent may also scan the unit to be stowed with reader 196. Reader 196 may determine the unit's identity (i.e., the type of item) and provide control system 190 with such information.

Figure 6:
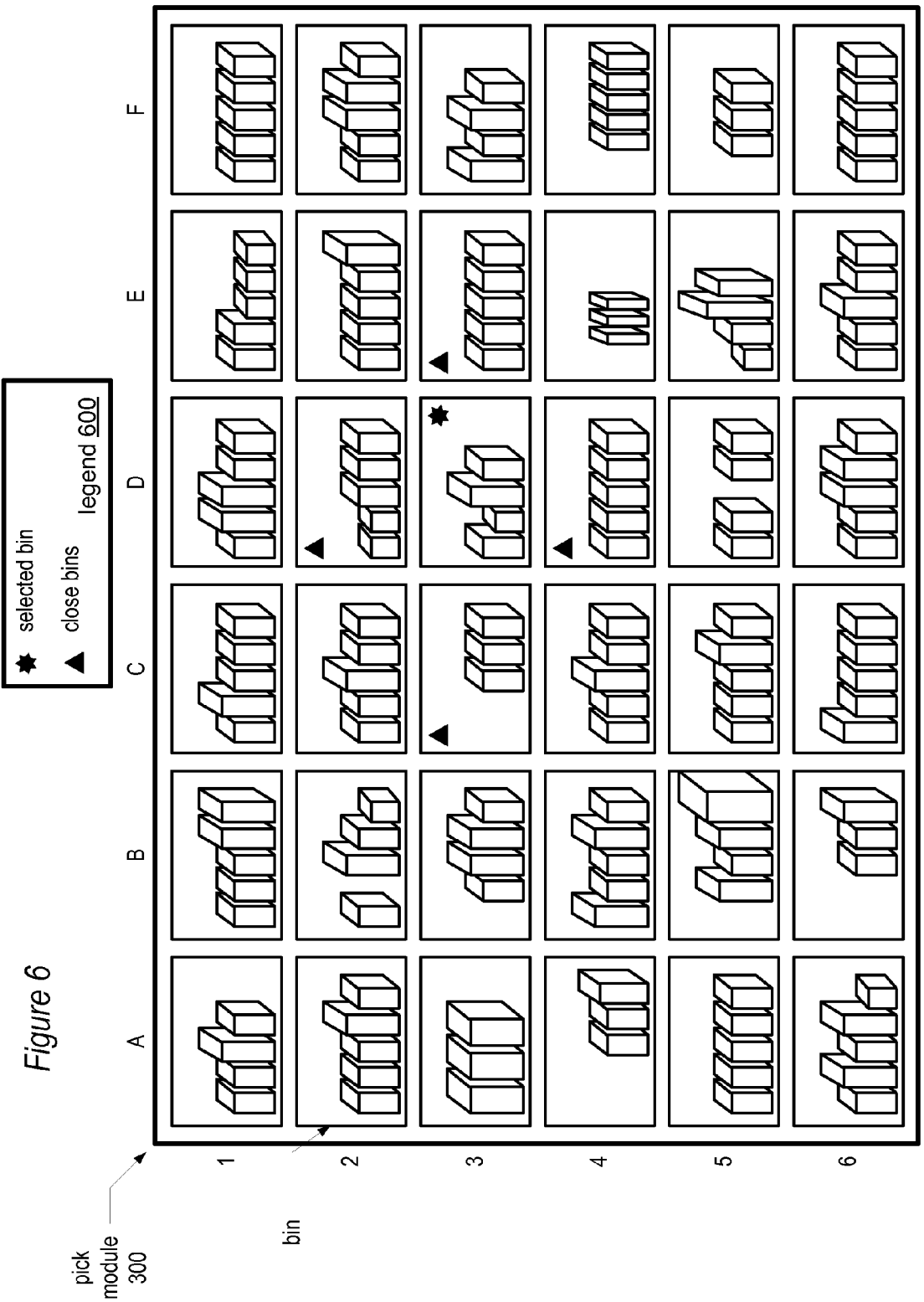
FIG. 6 illustrates an exemplary group of bins determined to be close to a selected bin, according to some embodiments.

Control system 190 may determine a group of one or more bins that are close to the selected bin (e.g., the scanned bin) based on one or more closeness criteria. Such closeness criteria may in some embodiments include an indication of the quantity of bins away from the selected bin that a bin may be located while still being considered close to the selected bin. For instance, in one embodiment, if such one or more closeness criteria specified such quantity to be two bins, then each bin that was a degree of two bins away from the selected bin would be determined to be close to the selected bin. In some embodiments, such closeness criteria may also specify positional or directional information along with a quantity of bins away from the selected bin that a bin may be while still being considered close to the selected bin. For instance, the closeness criteria might specify that only one bin to the left of the selected bin, one bin to the right of the selected bin, one bin above the selected bin, and one bin below the selected bin are specified as being close to the selected bin (an exemplary group of close bins according to this requirement is illustrated in FIG. 6, described below). In other cases, closeness may be specified in other measurements. In one example, closeness criteria may be specified by a closeness radius of 5 feet. That is, each bin within a 5 foot radius of the selected bin may be considered to be close to the selected bin. In another embodiment, the selected bin may be a constituent bin of a predefined bay of bins (e.g., any predefined group of bins, such as all bins of a particular row or column of pick module 300) and the closeness criteria may specify that all bins of a given bay are to be considered close to each other.

In one particular example, in addition to a record or map specifying physical distances between various bins, control system 190 may create, maintain, and/or have access to a record of historical statistics regarding the agent travel time between particular bins. For example, such historical statistics might indicate the average or median time that elapses between a pick performed at bin A1 and a pick performed at bin F5. Note that such statistics need not be limited to bins of the same pick module. In various cases, such statistics may be available for each bin within the materials handling facility. For example, such statistics may specify an average or median time to travel between a bin at pick module 300 and another bin of another pick module in the materials handling facility. In various cases, the travel time (e.g., historical average or median travel time) between two bins need not necessarily correspond to the physical distance between such bins. For instance, consider 3 bins referred to as BIN1, BIN2, and BIN3. The physical distance between BIN1 and BIN2 may be larger than the physical distance between BIN1 and BIN3. However, the historical travel time between BIN1 and BIN2 may be less than the historical travel time between BIN1 and BIN3. Such difference may be caused by various factors, such as congestion (e.g., other agents picking items) on the path from BIN1 to BIN3. Accordingly, in various embodiments, the closeness criteria described above may include a threshold of historical travel time. For instance, such closeness criteria might specify that all bins within 25 seconds travel time from the selected bin are considered close to the selected bin.

Based on any of the various closeness criteria described above, reader 196 and/or control system 190 may determine a group of items that are close to the selected bin. Referring collectively to FIGS. 5 and 6, pick module 300 illustrates a selected bin, which is the bin being evaluated. For instance, as described above, the agent may scan such bin with reader 196 to determine the bin's identity. FIG. 6 includes one example of a selected bin and a group of bins determined to be close to the selected bin. As indicated by legend 600, the selected bin is bin D3. For instance, an agent may have chosen D3 as a potential location in which to stow a unit of a particular item. As indicated by legend 600, the bins determined to be close to the selected bin include bins D2, D4, C3, and E3. Such closeness criteria was described above as, e.g., requirements specifying that only one bin to the left of the selected bin, one bin to the right of the selected bin, one bin above the selected bin, and one bin below the selected bin are considered close to the selected bin. Note that this closeness criteria is merely exemplary and that other closeness criteria, such as the various types of closeness criteria described above, may be utilized in other embodiments. Note that the determination of the group of bins that are close to the selected bin may be done in real time or prior to the operations described herein. For instance, the control system may store a representation of the various bins and respective locations of such bins. From such representation, the control system may be configured to generate an index that indicates, for each given bin of the materials handling facility, the other bins that are determined to be close to the given bin. Such representation may be updated over time as conditions within the materials handling facility evolve.

The group of one or more bins that are close to the selected bin may be used to perform one or more determinations. In various embodiments, reader 196 and/or control system 190 may determine whether the units of the group of close bins are the same as the unit of the particular item that is to be stowed. If reader 196 and/or control system 190 determine that one of the bins of the group of close bins does include at least one unit that is the same as the unit of the particular item that is to be stowed, reader 196 and/or control system 190 may indicate that the selected bin is not eligible to stow the unit of the particular item to be stowed (such as illustrated in FIG. 5B). The reader 196 and/or control system 190 may enforce such policy in order to prevent the item from being stowed in a bin that is close to another bin stowing the same item. As described above, this may prevent picker errors during subsequent picking operations. Also note that reader 196 and/or control system 190 may allow a unit to be stowed in the same bin with other units of the same item since, in many pick operations, agents are not instructed to discriminate between units of the same item. For instance, in various embodiments if an agent is instructed to pick a particular book from a bin that include multiple copies of the same book, it typically does not matter which of such copies the agent picks from the bin.

If reader 196 and/or control system 190 determine that none of the bins of the group of close bins include at least one unit that is the same as the unit of the particular item that is to be stowed, reader 196 and/or control system 190 may indicate that the selected bin is eligible to stow the unit of the particular item to be stowed (such as illustrated in FIG. 5A). However, in other embodiments, instead of indicating that the selected bin is eligible to stow the unit of the particular item to be stowed, reader 196 and/or control system 190 may instead perform an additional evaluation with respect to similar items, as described below.

Such additional evaluation may in various embodiments include reader 196 and/or control system 190 determining whether the units of the group of close bins contain at least one unit that is similar to the unit of the particular item that is to be stowed (based on one or more similarity criteria, describe in more detail below). If reader 196 and/or control system 190 determine that one of the bins of the group of close bins or the selected bin itself includes at least one unit of an item that is similar to the item of the unit that is to be stowed, reader 196 and/or control system 190 may indicate that the selected bin is not eligible to stow the unit of the particular item to be stowed (such as illustrated in FIG. 5B). The reader 196 and/or control system 190 may enforce such policy in order to prevent the item from being stowed in a bin that is close to another bin stowing a similar item. As described above, this may prevent picker errors during subsequent picking operations. Also note that reader 196 and/or control system 190 may prevent a unit from being stowed in the same bin with units of similar items since, in various pick operations, agents may confuse one of such units for the other or vice versa. For instance, in various embodiments if an agent is instructed to pick a particular book from a bin that includes multiple versions of that book (e.g., hardcover or paperback version of the same book), the agent would be expected to differentiate between such versions, according to various embodiments.

As described above, various similarity criteria may be utilized by reader 196 and/or control system 190 to determine whether the unit of the particular item to be stowed is similar to a unit of an item in another bin or in the selected bin. In one embodiment, the control system may create, manage, and/or have access to various product information for the units of items stored in the various pick modules. For instance, for each item, the control system may store an entry in a database that specifies relevant attributes such as, e.g., title or name, product dimensions, weights, product category (e.g., book, movies, music, sports, apparel, camping, etc.), author, and any other descriptive information about an item. Accordingly, the similarity criteria may in various embodiments specify a threshold for difference among one or more of such product attributes. For instance, in one embodiment, the similarity criteria may specify that if the title of the unit to be stowed and the title of another unit (e.g., a unit of from one of the bins considered to be close to the selected bin) are measured to have a degree of similarity that is greater than a requisite degree of similarity (e.g., a threshold), then such items are determined to be similar. In one embodiment, such requisite degree of similarity may be indicated as Levenshtein distance, and a Levenshtein algorithm may be used to determine the Levenshtein distance between the titles of such units. In one embodiment, such Levenshtein distance may be expressed as a number of characters and/or operations required to transform the title of the unit to be stowed to a title of a unit of another close bin, or vice versa. In other embodiments, other types of text evaluation algorithms (e.g., a Hamming distance algorithm) may be used to determine the differences between titles or other attributes of two or more units.

In other embodiments, other types of evaluations may be performed to determine whether two units are similar. For example, as described above, the control system may maintain a database of product attributes. In some embodiments, reader 196 and/or control system 190 may determine that two items are similar if such items have a requisite degree of similarity with respect to each other. Such requisite degree of similarity may specify a minimum number of attributes common between the units. In another case, such requisite degree of similarity may specify that a particular attribute be common between the units.

If reader 196 and/or control system 190 determine that the selected bin and the bins of the group of close bins do not include a unit of an item that is determined to be similar to the item of the unit to be stowed, reader 196 and/or control system 190 may indicate that the selected bin is eligible to stow the unit of the particular item to be stowed (such as illustrated in FIG. 5A). Note that while the above described operations of reader 196 and control system 190 describe a system that, for a given unit of a particular item to be stowed, first checks for units that are the same as the particular item and then checks for units that are similar to the particular item, in other embodiments such operations may be reversed.

Figure 7:
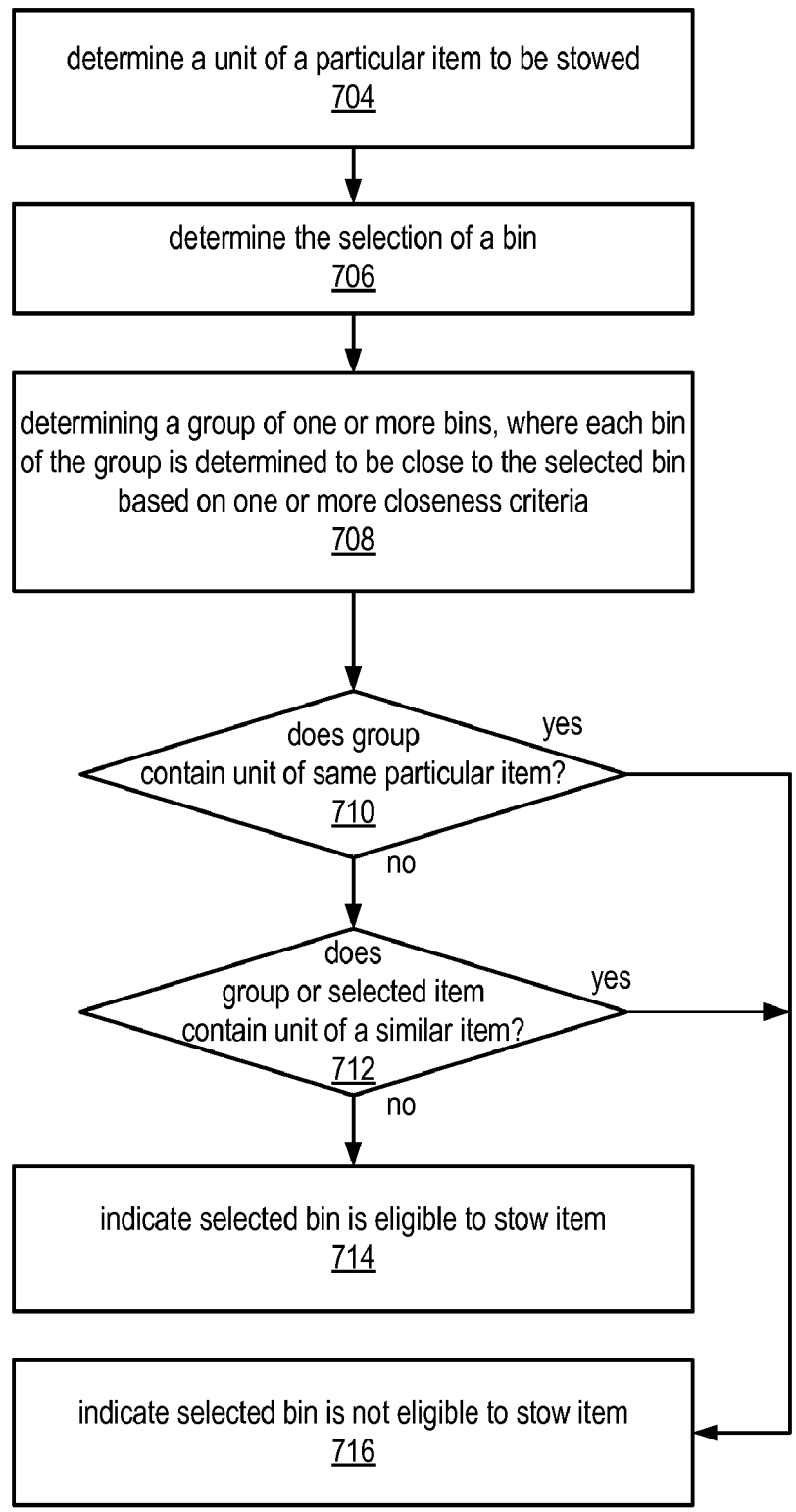
FIG. 7 illustrates a flowchart of an exemplary method for determining whether a given bin is eligible to stow a unit of a particular item, according to some embodiments.

FIG. 7 illustrates an exemplary method according to one embodiment. In some embodiments, the method of FIG. 7 may be performed by reader 196 and or control system 190. In various embodiments, portions of the method may be performed by reader 196 whereas other portions may be performed by control system 190. For example, in one example, reader 196 may perform blocks 704, 706, 714, or 716 whereas control system 190 may perform blocks 708, 710, and 712. In other embodiments, the method of FIG. 7 may be entirely performed by one of the control system, the reader, or some other system. As illustrated by block 704, the method may include determining a unit of a particular item to be stowed. For instance, the method may include receiving an indication of a unit of a particular item to be stowed by determining that an agent has scanned the unit with an electronic stow device, such as reader 196. For example, the method may include scanning the particular item to be stowed to determine an identifier of the unit, such as through optical or RFID scanning. As illustrated by block 706, the method may further include determining that a particular bin has been selected, such as selected with an electronic stow device. For instance, the method may include receiving an indication of a bin to evaluate by determining that an agent has scanned the bin with a reader (e.g., reader 196).

As illustrated by block 708, the method may further include determining a group of one or more bins that are each determined to be close to the selected bin based on one or more closeness criteria. As described above, such closeness criteria may in some embodiments include an indication of the quantity of bins away from the selected bin that a bin may be while still being considered close to the selected bin. For instance, in one embodiment, if such one or more closeness criteria specified such quantity to be two bins, then each bin that was a degree of two bins away from the selected bin would be determined to be close to the selected bin. In some embodiments, such closeness criteria may also specify directional information along with a quantity of bins away from the selected bin that a bin may be while still being considered close to the selected bin. For instance, the closeness criteria might specify that only one bin to the left of the selected bin, one bin to the right of the selected bin, one bin above the selected bin, and one bin below the selected bin are specified as being close to the selected bin (an exemplary group of close bins accord to this requirement is illustrated in FIG. 6, described above). In other cases, closeness may be specified in other measurements. In one example, closeness criteria may be specified by an exemplary closeness radius of 5 feet. That is, each bin within a 5 foot radius of the selected bin may be considered to be close to the selected bin. In another embodiment, the selected bin may be a constituent bin of a predefined bay of bins (e.g., any predefined group of bins, such as all bins of a particular row or column of pick module 300) and the closeness criteria may specify that all bins of a given bay are to be considered close to each other. Accordingly, the method may include determining a group of bins that are close to the selected bin according to any of such closeness criteria.

In one particular embodiment, the method may include creating, maintaining, and/or accessing a record of historical statistics regarding the agent travel time between particular bins. For example, such historical statistics might indicate the average or median time that elapses between a pick performed at bin A1 and a pick performed at bin F5. Note that such statistics need not be limited to bins of the same pick module. In various cases, such statistics may be available for each bin within the materials handling facility. For example, such statistics may specify an average or median time to travel between a bin at pick module 300 and another bin of another pick module in the materials handling facility. As described above, in various cases, the travel time (e.g., historical average or median travel time) between two bins need not necessarily correspond to the physical distance between such bins. In various embodiments, the closeness criteria described above may include a threshold of historical travel time. For instance, such closeness criteria might specify that all bins within 25 seconds travel time from the selected bin are considered close to the selected bin. Accordingly, the method described herein may include determining whether a given bin is close to the selected by determining whether historical travel time between the given bin and the selected bin meets a threshold of historical travel time specified by the closeness criteria. In various embodiments, such closeness criteria may be configurable, such as by a system administrator.

Note that the determination of the group of bins that are close to the selected bin may be done in real time or prior to the operations described herein. For instance, the method may include storing a representation of the various bins and respective locations of such bins. From such representation, the control system may be configured to generate an index that indicates, for each given bin of the materials handling facility, the other bins that are determined to be close to the given bin. Such index may be accessed to perform block 708 of the illustrated method.

As illustrated by block 710, the method may include determining whether the group of close items includes a unit of an item that is the same as the unit of the particular item to be stowed. For instance, the method may include storing a representation of multiple bins and their contents (e.g., units) and comparing the unit to be stowed to such representation. If the determination is made that one of the bins of the group of close bins does include at least one unit that is the same as the unit of the particular item that is to be stowed, the method may include indicating that the selected bin is not eligible to stow the unit of the particular item to be stowed (such as illustrated in FIG. 5B and block 716). The method may enforce such policy in order to prevent the unit from being stowed in a bin that is close to another bin stowing a unit of the same item. As described above, this may prevent picker errors during subsequent picking operations. Also note that the method may include allow a unit to be stowed in the same bin with other units of the same item since, in various pick operations, agents are not instructed to discriminate between units of the same item.

If it is determined that none of the bins of the group of close bins include at least one unit that is the same as the unit of the particular item that is to be stowed, the method may include indicating that the selected bin is eligible to stow the unit of the particular item to be stowed (such as illustrated in FIG. 5A). However, in the illustrated embodiment, instead of indicating that the selected bin is eligible to stow the unit of the particular item to be stowed, reader 196 and/or control system 190 may instead perform an additional evaluation with respect to similar items, as described below with respect to block 712.

As illustrated by block 712, the method may include determining whether the group of close items or the selected item contain a unit of a similar item that is determined to be similar to the item of the unit to be stowed based on one or more similarity criteria. If it is determined that one of the bins of the group of close bins or the selected bin itself includes at least one unit of an item that is similar to the item of the unit that is to be stowed, the method may include indicating that the selected bin is not eligible to stow the unit of the particular item to be stowed (such as illustrated in FIG. 5B and block 716). The method may enforce such policy in order to prevent the item from being stowed in a bin that is close to another bin stowing a similar item. As described above, this may prevent picker errors during subsequent picking operations. Also note that the method may include preventing a unit from being stowed in the same bin with units of similar items since, in various pick operations, agents may confuse one of such units for the other or vice versa.

As described above, the method may include utilizing various similarity criteria to determine whether the unit of the particular item to be stowed is similar to a unit of an item in another bin or in the selected bin. In one embodiment, the method may include creating, managing, and/or accessing various product information for the units of items stored in the various pick modules. For instance, for each item, the method may store an entry in a database that specifies relevant attributes such as, e.g., title or name, product dimensions, weights, product category (e.g., book, movies, music, sports, apparel, camping, etc.), author, and any other descriptive information about an item. Accordingly, the similarity criteria may in various embodiments specify a threshold for difference among one or more of such product attributes. For instance, in one embodiment, the similarity criteria may specify that if the title of the unit to be stowed and the title of another unit (e.g., a unit of from one of the bins considered to be close to the selected bin) are measured to have a requisite degree of similarity (e.g., a threshold), then such items are determined to be similar. In one embodiment, such requisite degree of similarity may be indicated as Levenshtein distance, and a Levenshtein algorithm may be used to determine the Levenshtein distance between the titles of such units. In one embodiment, such Levenshtein distance may be expressed as a number of characters and/or operations required to transform the title of the unit to be stowed with a title of a unit of another bin, or vice versa. In various embodiments, the method may include performing a Levenshtein distance analysis on bins to determine whether they are similar. In other cases, the method may include performing other types of text evaluation algorithms to determine the differences between titles or other attributes of two units.

In other embodiments, the method may include performing other types of evaluations to determine whether two units are similar. For example, the method may include maintaining a database of product attributes. In some embodiments, the method may include determining that two items are similar if such items have a requisite degree of similarity with respect to each other. Such requisite degree of similarity may specify a minimum number of attributes common between the units. In another case, such requisite degree of similarity may specify that a particular attribute be common between the units.

If it is determined that the selected bin and the bins of the group of close bins do not include a unit of an item that is determined to be similar to the item of the unit to be stowed, the method may include indicating that the selected bin is eligible to stow the unit of the particular item to be stowed (such as illustrated in FIG. 5A and block 714). Note that in various embodiments, the order in which various portions of the methods described herein are performed may be altered. For instance, block 706 might be performed before block 704, or block 712 might be performed before block 710. In general, various modifications (additions, substitutions, omissions, etc.) may be made to the methods described herein while remaining within the spirit and scope of various embodiments.

Figure 8:
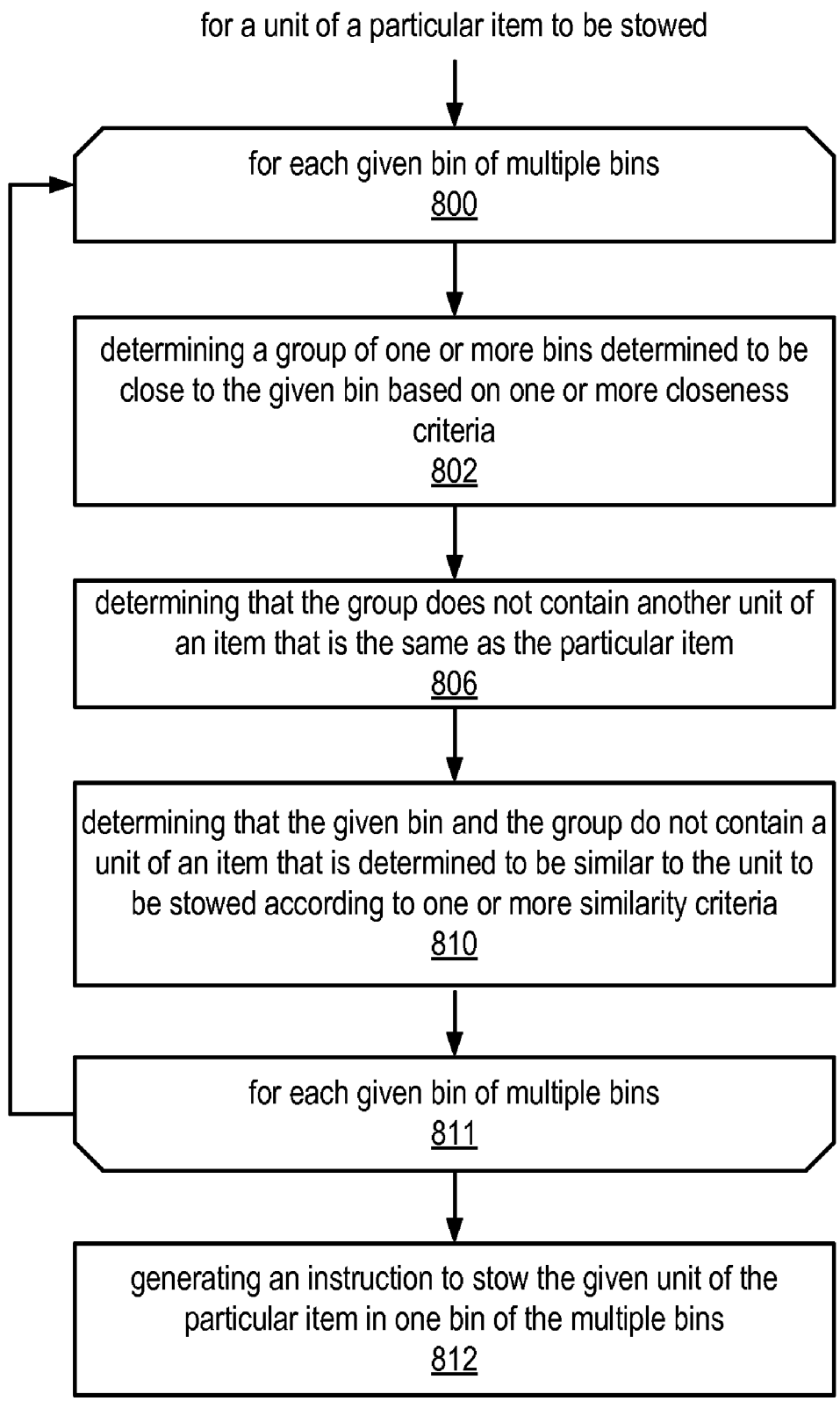
FIG. 8 illustrates a flowchart of an exemplary method for generating an instruction to stow a given unit in a particular item in a particular bin, according to some embodiments.
Figure 9:
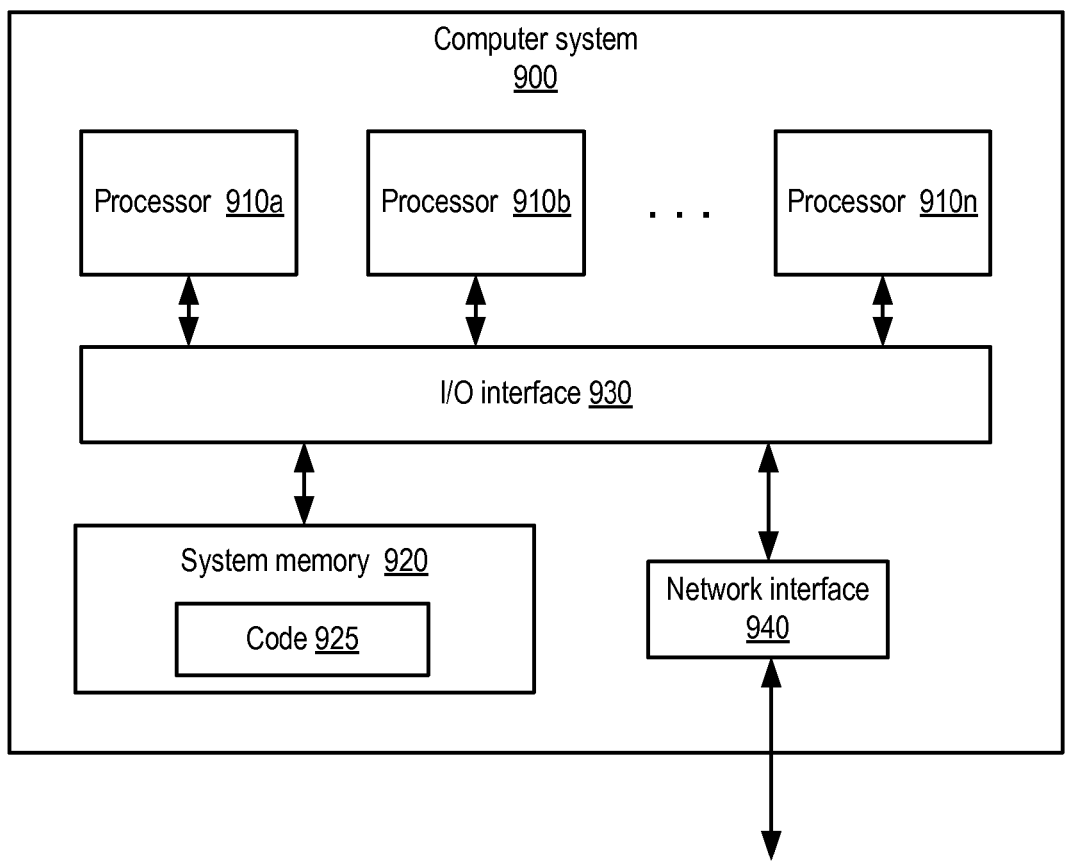
FIG. 9 is a block diagram illustrating an exemplary embodiment of a computer system, according to some embodiments.

Instead of evaluating one bin to determine whether the bin is eligible to stow an item that is to be stowed (such as might occur during an impromptu stow process), various embodiments may include a directed system where units of item are directed to particular bins throughout the materials handling facility. For instance, such direction may be specified by one or more stow lists that may be printed and given to agents along with a batch of units to stow. Such stow list may specify instructions to stow each of the batch of units in particular bins. For instance, instead of utilizing a reader to check various bins for their eligibility to stow a given unit, the agent may instead stow items accord to the stow list. In other cases, the system may include one or more conveyance systems that direct items to their respective bins according to a stow list or similar record. FIG. 8 illustrates one method for generating an instruction to stow a given unit of a particular item to be stowed. For instance, such instruction might be an entry of one of the aforementioned stow lists. In other cases, such instruction might be an instruction to one or more conveyance mechanisms to deliver a unit to a bin in which the unit is instructed to be stowed.

As illustrated by blocks 800 and 811, blocks 802, 806 and 810 may be repeated for each of multiple bins evaluated for the unit that is to be stowed. As illustrated by block 802, the method may include determining a group of one or more bins determined to be close to the given bin based on one or more closeness criteria. In various embodiments, any of the various techniques described above with respect to block 708 may be performed as part of the method to determine such a group. As illustrated by block 806, the method may include determining that the group does not contain another unit of an item that is the same as the particular item of the unit to be stowed. For instance, the method may include storing a representation of multiple bins and their contents (e.g., units) and comparing the unit to be stowed to such representation to determine that that the group of close bins does not contain another unit of an item that is the same as the particular item. In various embodiments, any of the other techniques for performing such determination may also be employed by the illustrated method, such as the techniques described above with respect to block 710. As illustrated by block 810, the method may further include determining that the group does not contain another unit of an item that is, based on one or more similarity criteria, similar to the particular item of the unit to be stowed. For instance, the method may include storing a representation of multiple bins and their contents and comparing the unit to be stowed to such representation to determine that the group does not contain another unit of an item that is, based on one or more similarity criteria, similar to the particular item of the unit to be stowed. In various embodiments, any of the other techniques for performing such determination may also be employed by the illustrated method, such as the techniques described above with respect to block 712. After blocks 802, 806 and 810 are performed for one or more bins, the method may include selecting one of such bins for which an instruction to stow is generated. As illustrated by block 812, the method may include generating an instruction to stow the given unit of the particular item to be stowed in one of the bins for which the above described determinations (e.g., block 802, 806 and 810) are valid. In various embodiments, the method described herein may be repeated for multiple items to be stowed in order to generate an instruction to stow for each of such items. For instance, as described above, a stow list may include multiple entries that are instructions to stow multiple units in respective bins.

In various embodiments, the various techniques and methods described herein need not be limited to bins of inventory. For instance, in some embodiments, various receptacles are utilized during the receiving 80 stage to store items that will later be stowed in inventory. In various embodiments, the various techniques and methods described herein may be utilized to ensure that units of similar items are not stored in the same or nearby receptacles. Such techniques may also prevent the storing of units of the same items in nearby bins while allowing the storing of units of the same items in the same bin, according to the various methods described herein.

Exemplary System

In one embodiment, a system that implements one or more components of a system and method for stow management of similar items as described herein may include a general-purpose computer system that includes or is configured to access one or more computer-accessible media, such as computer system 900 illustrated in FIG. 8. Such computer system may in various embodiments implement control system 190 and/or reader 196 described herein. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for a control system 190 and/or reader 196 of a system and method for stow management of similar items, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 800, such as other computer systems, communications devices, control mechanisms, readers, scanners and so on that are components of the system and method for stow management of similar items. The communications channels may include, but are not limited to conventional and mobile telephone and text messaging communications channels. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 8 for implementing a control system for, or possibly other components of a system and method for stow management of similar items (e.g., reader 196). However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that embodiments embrace all such modifications and changes and, accordingly, the above description to be regarded in an illustrative rather than a restrictive sense.

What is claimed is:

1. A computer-implemented method, comprising:
performing, by one or more computers:
receiving an indication of a given unit of a particular item that is to be stowed;
receiving a selection of a bin of a plurality of bins, wherein each bin of the plurality of bins is configured to hold one or more units of items;
determining a group of one or more bins of the plurality bins other than the selected bin, wherein each bin of the group is determined to be close to the selected bin based on one or more closeness criteria indicating distance or positional requirements for determining whether bins are close to each other;

if the group does not contain an other unit of the particular item, and if the group and the selected bin do not contain a unit of an item that is similar to said particular item according to one or more similarity criteria indicating requirements for determining whether items are similar based on attributes of those items, generating an indication that specifies the selected bin is eligible to stow the given unit of the particular item; and if the group contains an other unit of the particular item, or if the group or the selected bin contain a unit of an item that is similar to said particular item according to said one or more similarity criteria, generating an indication that specifies the selected bin is ineligible to stow the given unit of the particular item.

2. The computer-implemented method of claim 1, wherein said closeness criteria specifies a distance threshold with respect to the selected bin, wherein determining the group of the one or more bins comprises, for each given bin of at least one of the plurality of bins, determining that the given bin is located within the distance threshold with respect to the selected bin, and indicating the given bin as a member of the group.

3. The computer-implemented method of claim 1, wherein said closeness criteria specifies a travel time threshold with respect to the selected bin, wherein determining the group of the one or more bins comprises, for each given bin of at least one of the plurality of bins, determining that the historical travel time between the given bin and the selected bin is less than the travel time threshold, and indicating the given bin as a member of the group.

4. The computer-implemented method of claim 1, wherein to determine whether the group of bins or the selected bin contains a unit of an item that is similar to the particular item, the method comprises determining whether any title of the units stored in said group and said selected bin are similar to a title of the particular item.

5. The computer-implemented method of claim 4, wherein to determine whether any of the titles of the units stored in said group and said selected bin are similar to the title of the particular item, the method comprises comparing a title of a particular unit to the title of said particular item via a Levenshtein algorithm to determine a corresponding Levenshtein distance.

6. The computer-implemented method of claim 5, wherein the similarity criteria specifies a Levenshtein distance threshold, wherein the method further comprises determining whether said corresponding Levenshtein distance is less than the Levenshtein distance threshold, and if the corresponding Levenshtein distance is less than the Levenshtein distance threshold, determining that the particular unit and the unit of the particular item to be stowed are similar.

7. The computer-implemented method of claim 1, wherein to determine whether the group of bins or the selected bin contains a unit of an item that is similar to the particular item, the method comprises comparing one or more product attributes of the units of the group of bins or the selected bin to one or more attributes of the unit of the particular item to be stowed.

8. The computer-implemented method of claim 1, wherein the method further comprises, via a portable device configured to identify units of items and identify bins of a materials handling facility, performing one or more of said receiving said indication, said receiving said selection, and said generating.

9. A computer-implemented method, comprising:
performing, by one or more computers:

from a plurality of bins configured to hold one or more units of items, determining one or more particular bins that are eligible to stow a given unit of a particular item, wherein determining each given bin of the one or more particular bins comprises:

determining a group of one or more bins of the plurality bins other than the given bin, wherein each bin of the group is determined to be close to the given bin based on one or more closeness criteria indicating distance or positional requirements for determining whether bins are close to each other;

determining that the group does not contain an other unit of the particular item; and determining that the given bin and the group do not contain a unit of an item that is determined to be similar to said particular item according to one or more similarity criteria indicating requirements for determining whether items are similar based on attributes of those items; and generating an instruction to stow the given unit of the particular item in one of the one or more particular bins.

10. The computer-implemented method of claim 9, wherein said closeness criteria specifies a distance threshold with respect to the given bin, wherein determining the group of the one or more bins comprises, for each given bin of at least one of the plurality of bins, determining that the given bin is located within the distance threshold with respect to the given bin, and indicating the given bin as a member of the group.

11. The computer-implemented method of claim 9, wherein said closeness criteria specifies a travel time threshold with respect to the given bin, wherein determining the group of the one or more bins comprises, for each given bin of at least one of the plurality of bins, determining that the historical travel time between the given bin and the given bin is less than the travel time threshold, and indicating the given bin as a member of the group.

12. The computer-implemented method of claim 9, wherein to determine that the given bin and the group do not contain a unit of an item that is determined to be similar to said particular item, the method comprises determining that none of the titles of the units stored in said group and said given bin are similar to a title of the particular item.

13. The computer-implemented method of claim 12, wherein to determine that the given bin and the group do not contain a unit of an item that is determined to be similar to said particular item, the method comprises comparing a title of a particular unit to the title of said particular item via a Levenshtein algorithm to determine a corresponding Levenshtein distance.

14. The computer-implemented method of claim 13, wherein the similarity criteria specifies a Levenshtein distance threshold, wherein determining that the given bin and the group do not contain a unit of an item that is determined to be similar to said particular item comprises determining that said corresponding Levenshtein distance is greater than the Levenshtein distance threshold.

15. The computer-implemented method of claim 9, wherein to determine that the given bin and the group do not contain a unit of an item that is determined to be similar to said particular item, the method comprises comparing one or more product attributes of the units of the group or the given bin to one or more attributes of the unit of the particular item to be stowed.

16. A system, comprising:
    one or more processors; and
    a memory coupled to the one or more processors, wherein the memory stores program instructions executable by the one or more processors to:

receive an indication of a given unit of a particular item that is to be stowed;

receive a selection of a bin of a plurality of bins, wherein each bin of the plurality of bins is configured to hold one or more units of items;

determine a group of one or more bins of the plurality bins other than the selected bin, wherein each bin of the group is determined to be close to the selected bin based on one or more closeness criteria indicating distance or positional requirements for determining whether bins are close to each other;

if the group does not contain an other unit of the particular item, and if the group and the selected bin do not contain a unit of an item that is similar to said particular item according to one or more similarity criteria indicating requirements for determining whether items are similar based on attributes of those items, generate an indication that specifies the selected bin is eligible to stow the given unit of the particular item; and if the group contains an other unit of the particular item, or if the group or the selected bin contain a unit of an item that is similar to said particular item according to said one or more similarity criteria, generate an indication that specifies the selected bin is ineligible to stow the given unit of the particular item.

17. The system of claim 16, wherein said closeness criteria specifies a distance threshold with respect to the selected bin, wherein to determine the group of the one or more bins the program instructions are configured to, for each given bin of at least one of the plurality of bins, determine that the given bin is located within the distance threshold with respect to the selected bin, and indicate the given bin as a member of the group.

18. The system of claim 16, wherein said closeness criteria specifies a travel time threshold with respect to the selected bin, wherein to determine the group of the one or more bins the program instructions are configured to, for each given bin of at least one of the plurality of bins, determine that the historical travel time between the given bin and the selected bin is less than the travel time threshold, and indicate the given bin as a member of the group.

19. The system of claim 16, wherein to determine whether the group of bins or the selected bin contains a unit of an item that is similar to the particular item, the program instructions are configured to determine whether any title of the units stored in said group and said selected bin are similar to a title of the particular item.

20. The system of claim 19, wherein to determine whether any of the titles of the units stored in said group and said selected bin are similar to the title of the particular item, the program instructions are configured to compare a title of a particular unit to the title of said particular item via a Levenshtein algorithm to determine a corresponding Levenshtein distance.

21. The system of claim 20, wherein the similarity criteria specifies a Levenshtein distance threshold, wherein the program instructions are configured to determine whether said corresponding Levenshtein distance is less than the Levenshtein distance threshold, and if the corresponding Levenshtein distance is less than the Levenshtein distance threshold, determine that the particular unit and the unit of the particular item to be stowed are similar.

22. The system of claim 16, wherein to determine whether the group of bins or the selected bin contains a unit of an item that is similar to the particular item, the program instructions are configured to compare one or more product attributes of the units of the group of bins or the selected bin to one or more attributes of the unit of the particular item to be stowed.

23. The system of claim 16, wherein the program instructions are configured to, via a portable device configured to identify units of items and identify bins of a materials handling facility, perform one or more of said receiving said indication, said receiving said selection, and said generating.

24. A system, comprising:
one or more processors; and
a memory coupled to the one or more processors, wherein the memory stores program instructions executable by the one or more processors to:
from a plurality of bins configured to hold one or more units of items, determine one or more particular bins that are eligible to stow a given unit of a particular item, wherein to determine each given bin of the one or more particular bins, the program instructions are configured to:
determine a group of one or more bins of the plurality bins other than the given bin, wherein each bin of the group is determined to be close to the given bin based on one or more closeness criteria indicating distance or positional requirements for determining whether bins are close to each other;
determine that the group does not contain an other unit of the particular item; and
determine that the given bin and the group do not contain a unit of an item that is determined to be similar to said particular item according to one or more similarity criteria indicating requirements for determining whether items are similar based on attributes of those items; and
generate an instruction to stow the given unit of the particular item in a bin of the one or more particular bins.

25. The system of claim 24, wherein said closeness criteria specifies a distance threshold with respect to the given bin, wherein to determine the group of the one or more bins the program instructions are configured to, for each given bin of at least one of the plurality of bins, determine that the given bin is located within the distance threshold with respect to the given bin, and indicate the given bin as a member of the group.

26. The system of claim 24, wherein said closeness criteria specifies a travel time threshold with respect to the given bin, wherein to determine the group of the one or more bins the program instructions are configured to, for each respective bin of at least one of the plurality of bins, determine that the historical travel time between the respective bin and the given bin is less than the travel time threshold, and indicating the given bin as a member of the group.

27. The system of claim 24, wherein to determine that the given bin and the group do not contain a unit of an item that is determined to be similar to said particular item, the program instructions are configured to determine that none of the titles of the units stored in said group and said given bin are similar to a title of the particular item.

28. The system of claim 27, wherein to determine that the given bin and the group do not contain a unit of an item that is determined to be similar to said particular item, the program instructions are configured to compare a title of a particular unit to the title of said particular item via a Levenshtein algorithm to determine a corresponding Levenshtein distance.

29. The system of claim 28, wherein the similarity criteria specifies a Levenshtein distance threshold, wherein to determine that the given bin and the group do not contain a unit of an item that is determined to be similar to said particular item, the program instructions are configured to determine that said corresponding Levenshtein distance is greater than the Levenshtein distance threshold.

30. The system of claim 24, wherein to determine that the given bin and the group do not contain a unit of an item that is determined to be similar to said particular item, the program instructions are configured to compare one or more product attributes of the units of the group or the given bin to one or more attributes of the unit of the particular item to be stowed.

31. A non-transitory computer-readable storage medium storing program instructions computer-executable to:
receive an indication of a given unit of a particular item that is to be stowed;
receive a selection of a bin of a plurality of bins, wherein each bin of the plurality of bins is configured to hold one or more units of items;
determine a group of one or more bins of the plurality bins other than the selected bin, wherein each bin of the group is determined to be close to the selected bin based on one or more closeness criteria indicating distance or positional requirements for determining whether bins are close to each other;
if the group does not contain an other unit of the particular item, and if the group and the selected bin do not contain a unit of an item that is similar to said particular item according to one or more similarity criteria indicating requirements for determining whether items are similar based on attributes of those items, generate an indication that specifies the selected bin is eligible to stow the given unit of the particular item; and
if the group contains an other unit of the particular item, or if the group or the selected bin contain a unit of an item that is similar to said particular item according to said one or more similarity criteria, generate an indication that specifies the selected bin is ineligible to stow the given unit of the particular item.

32. The non-transitory computer-readable storage medium of claim 31, wherein said closeness criteria specifies a distance threshold with respect to the selected bin, wherein to determine the group of the one or more bins the program instructions are configured to, for each given bin of at least one of the plurality of bins, determine that the given bin is located within the distance threshold with respect to the selected bin, and indicate the given bin as a member of the group.

33. The non-transitory computer-readable storage medium of claim 31, wherein said closeness criteria specifies a travel time threshold with respect to the selected bin, wherein to determine the group of the one or more bins the program instructions are configured to, for each given bin of at least one of the plurality of bins, determine that the historical travel time between the given bin and the selected bin is less than the travel time threshold, and indicate the given bin as a member of the group.

34. The non-transitory computer-readable storage medium of claim 31, wherein to determine whether the group of bins or the selected bin contains a unit of an item that is similar to the particular item, the program instructions are configured to determine whether any title of the units stored in said group and said selected bin are similar to a title of the particular item.

35. The non-transitory computer-readable storage medium of claim 34, wherein to determine whether any of the titles of the units stored in said group and said selected bin are similar to the title of the particular item, the program instructions are configured to compare a title of a particular unit to the title of said particular item via a Levenshtein algorithm to determine a corresponding Levenshtein distance.

36. The non-transitory computer-readable storage medium of claim 35, wherein the similarity criteria specifies a Levenshtein distance threshold, wherein the program instructions are configured to determine whether said corresponding Levenshtein distance is less than the Levenshtein distance threshold, and if the corresponding Levenshtein distance is less than the Levenshtein distance threshold, determine that the particular unit and the unit of the particular item to be stowed are similar.

37. The non-transitory computer-readable storage medium of claim 31, wherein to determine whether the group of bins or the selected bin contains a unit of an item that is similar to the particular item, the program instructions are configured to compare one or more product attributes of the units of the group of bins or the selected bin to one or more attributes of the unit of the particular item to be stowed.

38. The non-transitory computer-readable storage medium of claim 31, wherein the program instructions are configured to, via a portable device configured to identify units of items and identify bins of a materials handling facility, perform one or more of said receiving said indication, said receiving said selection, and said generating.

39. A non-transitory computer-readable storage medium storing program instructions computer-executable to:
from a plurality of bins configured to hold one or more units of items, determine one or more particular bins that are eligible to stow a given unit of a particular item, wherein to determine each given bin of the one or more particular bins, the program instructions are configured to:
determine a group of one or more bins of the plurality bins other than the given bin, wherein each bin of the group is determined to be close to the given bin based on one or more closeness criteria indicating distance or positional requirements for determining whether bins are close to each other;
determine that the group does not contain an other unit of the particular item; and
determine that the given bin and the group do not contain a unit of an item that is determined to be similar to said particular item according to one or more similarity criteria indicating requirements for determining whether items are similar based on attributes of those items; and
generate an instruction to stow the given unit of the particular item in a bin of the one or more particular bins.

40. The non-transitory computer-readable storage medium of claim 39, wherein said closeness criteria specifies a distance threshold with respect to the given bin, wherein to determine the group of the one or more bins the program instructions are configured to, for each given bin of at least one of the plurality of bins, determine that the given bin is located within the distance threshold with respect to the given bin, and indicate the given bin as a member of the group.

41. The non-transitory computer-readable storage medium of claim 39, wherein said closeness criteria specifies a travel time threshold with respect to the given bin, wherein to determine the group of the one or more bins the program instructions are configured to, for each respective bin of at least one of the plurality of bins, determine that the historical travel time between the respective bin and the given bin is less than the travel time threshold, and indicating the given bin as a member of the group.

42. The non-transitory computer-readable storage medium of claim 39, wherein to determine that the given bin and the group do not contain a unit of an item that is determined to be similar to said particular item, the program instructions are configured to determine that none of the titles of the units stored in said group and said given bin are similar to a title of the particular item.

43. The non-transitory computer-readable storage medium of claim 42, wherein to determine that the given bin and the group do not contain a unit of an item that is determined to be similar to said particular item, the program instructions are configured to compare a title of a particular unit to the title of said particular item via a Levenshtein algorithm to determine a corresponding Levenshtein distance.

44. The non-transitory computer-readable storage medium of claim 43, wherein the similarity criteria specifies a Levenshtein distance threshold, wherein to determine that the given bin and the group do not contain a unit of an item that is determined to be similar to said particular item, the program instructions are configured to determine that said corresponding Levenshtein distance is greater than the Levenshtein distance threshold.

45. The non-transitory computer-readable storage medium of claim 44, wherein to determine that the given bin and the group do not contain a unit of an item that is determined to be similar to said particular item, the program instructions are configured to compare one or more product attributes of the units of the group or the given bin to one or more attributes of the unit of the particular item to be stowed.

* * * * *